United States Patent
Wicker, Jr. et al.

(10) Patent No.: US 10,815,421 B2
(45) Date of Patent: Oct. 27, 2020

(54) FLOW BACK AIDS

(71) Applicant: Ethox Chemicals, LLC, Greenville, SC (US)

(72) Inventors: Calvin M. Wicker, Jr., Spartanburg, SC (US); Paul Weipert, High Point, NC (US); Charles Francis Palmer, Jr., Greer, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 135 days.

(21) Appl. No.: 14/530,816

(22) Filed: Nov. 2, 2014

(65) Prior Publication Data

US 2015/0047849 A1 Feb. 19, 2015

Related U.S. Application Data

(63) Continuation-in-part of application No. 14/218,966, filed on Mar. 18, 2014, now abandoned.

(60) Provisional application No. 61/787,076, filed on Mar. 15, 2013.

(51) Int. Cl.
*C09K 8/80* (2006.01)

(52) U.S. Cl.
CPC .............. *C09K 8/805* (2013.01); *C09K 8/80* (2013.01)

(58) Field of Classification Search
CPC .... C09K 8/588; C09K 2208/10; C09K 8/584; E21B 33/138
USPC ...................................................... 166/308.2
See application file for complete search history.

(56) References Cited

U.S. PATENT DOCUMENTS

| | | | | |
|---|---|---|---|---|
| 7,238,648 | B2 * | 7/2007 | Dahayanake | A61K 8/02 507/244 |
| 2013/0180723 | A1 * | 7/2013 | Crick | C09K 8/602 166/308.2 |
| 2014/0027121 | A1 * | 1/2014 | Jackson | E21B 43/267 166/308.2 |
| 2014/0060832 | A1 * | 3/2014 | Mahoney | C09K 8/80 166/280.2 |
| 2014/0338906 | A1 * | 11/2014 | Monastiriotis | C09K 8/805 166/280.2 |

* cited by examiner

*Primary Examiner* — Zakiya W Bates
*Assistant Examiner* — Ashish K Varma
(74) *Attorney, Agent, or Firm* — Joseph T. Guy; Patent Filing Specialist, Inc.

(57) ABSTRACT

The present invention discloses liquid quaternary ammonium salts that can be used to treat and coat the surfaces of the proppant sand or inorganic particles that are used in down-hole oil well fracturing operations as well as the containment structure and that these treated surfaces will cause water and oils to flow faster through the porous structure. These liquid quaternary ammonium salts can be chosen from a list that includes but is not limited to cocobis(2-hydroxyethyl)ethylammonium ethyl sulfate, benzylcocobis(hydroxyethyl)ammonium 2-ethylhexylsulfate, dibenzylcocobishydroxyethyl ammonium phenolsulfonate, didecyldimethyl-ammonium dodecylbenzenesulfonate and tallow-bis(2-hydroxyethyl)ethylammonium ethyl sulfate.

8 Claims, No Drawings

FLOW BACK AIDS

This application is a continuation-in-part of pending U.S. application Ser. No. 14/218,966 entitled "Flow Back Aids" filed Mar. 18, 2014, the entire contents of which are incorporated by reference herein. This application also claims the priority benefit under 35 U.S.C. section 119 of U.S. Provisional Patent Application No. 61/787,076 entitled "Use Of Ionic Liquids To Increase The Rates Of Flow Of Multiphase Liquids Through Porous Media" filed on Mar. 15, 2013, and which is in its entirety herein incorporated by reference.

FIELD OF THE INVENTION

The present invention relates to the treatment of subterranean formations. More particularly, the present invention relates to methods and compositions for enhancing proppant pack conductivity and strength.

The invention relates to additives that enhance the recovery of hydrocarbons from subterranean formations. More particularly, the invention relates to novel fracturing methods utilizing additives which useful in increasing hydrocarbon production, limiting connate water production, resisting fracturing fluid loss into the subterranean formation, and reducing equipment requirements in mixing and pumping fracturing fluids.

The instant invention also relates to improved compositions and methods for enhancing fluid flow from a subterranean formation. In preferred embodiments, the present invention provides compositions and methods for enhancing subterranean well productivity by enhancing fracture conductivity.

The present invention further relates to high porosity propped fractures and methods of creating high porosity propped fractures in portions of subterranean formations.

This invention also relates generally to novel flowback aid compositions that are effective in aiding flowback of stimulation fluid from an oil or gas well. More specifically, the invention relates to such flowback aid compositions that enhance relative oil and gas permeability when applied with stimulation fluids to oil or gas wells.

This invention additionally involves compositions and a process for drilling or stimulating of subterranean reservoirs including but not restricted to shale, tight gas, coal, conventional and non-conventional reservoirs.

BACKGROUND OF THE INVENTION

The growing need for oil coupled with the decline in primary production of oil has required the need for more novel and efficient methods of recovering residual oil. These methods are generally referred to as improved oil recovery (IOR) or well stimulation. Many flow back aids have been developed and discussed in the prior art to help recover injected fluids after fracturing. The flow back aids benefits the production by reducing damage due to phase trapping, enhance mobilization of the oil and gas, help to increase the regained permeability and improve the oil/gas recovery.

Hydraulic fracturing is a technique for stimulating the production of a subterranean formation. The technique generally involves injecting a viscous liquid through a well bore into a portion of a subterranean formation at a chosen rate and pressure to overcome the formation's stresses and form or enhance a fracture in the formation; and placing proppant particulates in the fracture to, among other things, maintain the fracture in a propped condition when the injection pressure is released. The resultant propped fracture provides a conductive channel in the formation for fluids to flow to the well bore.

At the end of a hydraulic fracturing job, a large surface-area fracture will have been created and propped permanently open by the application of a proppant-laden, pressurized, often aqueous, hydraulic fluid. The next step in the hydraulic fracturing job is to decrease the pressure applied to the aqueous hydraulic fluid to allow the fluid sitting in the near well-bore region of the target formation between the targeted hydrocarbons and the wellbore to flow back into the well and up to the surface for treatment and disposal or re-use later.

The degree of stimulation afforded by the hydraulic fracture treatment is largely dependent on the permeability and width of the propped fracture. Thus, the productivity of the well, in effect, becomes a function of fracture conductivity. To enhance well productivity, it may be necessary to enhance fracture conductivity.

Oftentimes, to effectively prop open the fractures as well as to prevent proppant particulate flow back, the proppant particulates are caused to consolidate within the fractures. One conventional means of doing this is to use resin-coated proppant particulates so that when the resin cures, the proppant particulates can consolidate into a mass within the fractures.

Although consolidating the proppant particulates within a fracture may have some benefits, for example, preventing proppant particulate flow back, such methods may adversely affect the conductivity of the fracture. That is, some methods of consolidating proppant particulates themselves may introduce a barrier to the free flow of fluids from the subterranean formation to the well bore for subsequent production. Fracture conductivity may suffer as a result. This is undesirable as this may affect overall well productivity.

To counteract this potential problem, many different techniques have been developed. One technique involves adding calcium carbonate or salt to the proppant composition. Once the proppant particulates have substantially consolidated, the carbonate or salt dissolves. At least one problem associated with this method is the incomplete removal of the carbonate or salt if not adequately contacted with a fluid capable of dissolving the carbonate or salt. Another method has been to add wax particulates to the proppant composition. Once incorporated into the consolidated proppant particulates, the wax particulates may melt as a result of the temperature of the formation. A problem with this method is that the wax has been known to resolidify in the well, causing a multitude of problems. Another method that has been used is to add an oil-soluble resin to the proppant composition; however, this method has not been successful because of, among other things, nonuniform placement of the particles.

Another way to address fracture conductivity and proppant matrix permeability has been to use bigger proppant particulates. However, there are practical limits to the size of the proppant that may be used. For instance, if overly large particles are used, premature screen out at the perforations and/or fractures during the proppant stage of fracturing treatment often occurs as large size proppant particulates are injected into the fractures. In addition, by using overly large proppant particles, the ability to control formation sand may be lost as the formation sand or fines tend to invade or penetrate the large pore space of the proppant pack during production of hydrocarbons, thus choking the flow paths of the fluids.

Commonly used proppant particulates generally comprise substantially spherical particles, such as graded sand, bauxite, ceramics, or even nut hulls. Generally, the proppant particulates are placed in the fracture in a concentration such that they formed a tight pack of particulates. Unfortunately, in such traditional operations, when fractures close upon the proppant particulates they can crush or become compacted, potentially forming non-permeable or low permeability masses within the fracture rather than desirable high permeability masses; such low permeability masses may choke the flow path of the fluids within the formation. Furthermore, the proppant particulates may become embedded in particularly soft formations, negatively impacting production.

The degree of success of a fracturing operation depends, at least in part, upon fracture porosity and conductivity once the fracturing operation is stopped and production is begun. Traditional fracturing operations place a large volume of proppant particulates into a fracture and the porosity of the resultant packed propped fracture is then related to the interconnected interstitial spaces between the abutting proppant particulates. Thus, the resultant fracture porosity from a traditional fracturing operation is closely related to the strength of the placed proppant particulates (if the placed particulates crush then the pieces of broken proppant may plug the interstitial spaces) and the size and shape of the placed particulate (larger, more spherical proppant particulates generally yield increased interstitial spaces between the particulates).

The amount of fracturing fluid left behind in the formation will diminish to an irreducible fraction and then stop flowing back. This irreducible fraction of fracturing fluid left behind in the formation will subsequently impede the flow of hydrocarbon from the petroliferous formation into the very high permeability proppant pack.

A flowback aid may be included in the fracturing fluid to reduce capillary pressure and water blocks, thereby improving the kinetics of the flowback and preventing or minimizing the leaving-behind of any substantial amount of the fracturing fluid. Flowback aids, such as surfactants, have also been shown to aid in the "clean-up" of the proppant pack, thereby accelerating the flow of hydrocarbons through the high permeability proppant pack, as well. Known flowback aids each have their own set of properties and may present a tradeoff of one beneficial property for another undesirable property. Determining the best flowback aid for a specific reservoir may involve multiple considerations.

There is a need in the down-hole oil well fracturing industry for a chemical additive that will promote a faster and more uniform flow of mixtures of crude oil, natural gas and water outward through the pack of artificially placed proppant particles. It has been observed that without assistance the flow of this crude mixture will over time slow down and possibly stop altogether due to either a loss of porosity or to a loss of permeability. One common explanation for this phenomenon is that kerogen from the rock deposits, very high molecular weight fractions of the petroleum crude, and debris from the rock formation will deposit on the irregular edges of the fracture fissures and the proppant pores and continue to build up to a point that the openings become restricted or even blocked. This would be a loss of porosity. In other wells, the flow of one fluid such as water, becomes stagnant, and restricts the flow of crude oil. This would be a loss of permeability.

Thus, reducing the water saturation in the pores of the targeted subterranean petroliferous formation is desirable for increased production of oil or gas because the volume of the flow channel for oil or gas through the pores in the rock will be occupied, in part, by the immiscible water phase; and reducing the fraction of this volume that is occupied by water will necessarily increase the fraction of this volume that is available for flow by oil or gas.

The literature shows that from 60 to 90% of the injected fluids used in fracturing operations stay in tight gas reservoirs. These large amounts of water are believed to be trapped in the area surrounding the fracture and within the fracture. The trapped fluid lowers the relative permeability and effective flow area thereby decreasing well productivity. Many flow back aids have been developed and discussed in the prior art to help recover injected fluids after fracturing. The flow back aids reduce damage due to phase trapping, improve mobilization of the oil and gas, increase the regained permeability and enhance oil/gas production. A disadvantage of traditional flowback aids is the inclusion of a convention oil or solvent There thus exists an industrial need for novel flow hack aid compositions.

OBJECTS OF THE INVENTION

A first object of the invention is to provide novel flowback aids that improve oil and gas production.

It is another object of the present invention to provide additives for proppants.

A further object of the present invention is to provide improved proppants for enhanced productivity.

It is still another object of the instant of the invention to remove unwanted deposits from wellbore and production equipment.

It is a further object of the instant invention to provide enhanced fluid recovery and relative permeability enhancement of fractured subterranean formations.

Yet a further object of the invention is to provide novel wettability alteration, well cleanout, and reduced well damage due to phase trapping.

It is another object of the invention to provide novel flowback aids that improve oil and gas production.

SUMMARY OF THE INVENTION

The present invention relates to high porosity propped fractures and methods of creating high porosity propped fractures in portions of subterranean formations.

The present invention provides improved compositions and methods for enhancing fluid flow from a subterranean formation. In preferred embodiments, the present invention provides compositions and methods for enhancing subterranean well productivity by enhancing fracture conductivity.

The instant invention also provides a method of increasing the conductivity of a fracture in a portion of a subterranean formation comprising providing a slurry comprising a fracturing fluid and proppant particulates coated with an ionic liquid such as quaternary ammonium salt; introducing the slurry to the fracture and allowing the proppant particulates to form a substantially uniform particulate pack.

The invention is also a method of creating a particulate pack comprising providing a slurry comprising a fracturing fluid and proppant particulates coated with a quaternary ammonium liquid; introducing the slurry to the fracture and allowing the proppant particulates to form a substantially uniform particulate pack.

The objects, features and advantages of the present invention will be readily apparent to those skilled in the art upon a reading of the description of the preferred embodiments which follows.

In another aspect of the invention there is provided a proppant having incorporated therein a quaternary ammonium ionic liquid.

The invention also provides a fracturing fluid comprising a quaternary ammonium ionic liquid.

The invention further provides a method of fracturing a subterranean formation comprising: introducing a fracturing fluid through a well bore into the subterranean formation, wherein the fracturing fluid comprises a quaternary ammonium ionic liquid; pressurizing the fracturing fluid to fracture the subterranean formation; and allowing the fracturing fluid to flow back into the well bore from the subterranean formation.

The invention is also directed to a method for increasing the flow rate of water and hydrocarbons through a subterranean formation containing proppant particles said method comprising treating the proppant and formation surfaces with an amount sufficient to improve the water and hydrocarbon flow rate with a quaternary amine salt that is an ionic liquid at the temperature of the proppant and formation.

DETAILED DESCRIPTION OF THE PRESENT INVENTION

The instant invention fills an industrial need for improved flowback aids for use in oil and gas wells that have been subjected to the application of stimulation fluids. An aspect of the present invention is its usefulness for enhancing oil and gas recovery from subterranean reservoir formations by using quaternary ammonium ionic liquids.

The invention in a preferred embodiment is a quaternary ammonium ionic liquid flowback aid composition effective in aiding flowback of stimulation fluid from an oil or gas well and enhancing relative oil and gas permeability when applied with stimulation fluids to the oil or gas well.

The present invention provides improved compositions and methods for enhancing fluid flow from a subterranean formation. In preferred embodiments, the present invention provides compositions and methods for enhancing subterranean well productivity by enhancing fracture conductivity. The compositions and methods of the present invention may be used to enhance the permeability of proppant matrixes within fractures so that fluids from the subterranean formation may flow more freely to the well bore without negatively affecting the ability of the proppant matrix to perform other desired functions within the fracture, e.g., maintaining the integrity of a fracture or providing a sand control means.

The present invention is directed to the use solutions of quaternary ammonium compounds to deliver charged species to coat a pack of proppant and the walls of its containment area and create a treated surface that will improve the flow of different phases of liquids past it and through it. In particular, the invention is a treatment that would produce a surface that would have minimal interaction with hydrocarbon fluids and minimal interaction with water. We discovered that an ionic surface would have little interaction with hydrocarbons and that such a surface could be created by depositing quaternary ammonium compounds. Similarly, the alkyl or aryl organic groups of the quaternary ammonium compounds could be selected for little interaction with water. Because of the high affinity between the charged species and the hard surfaces, the instant treatment of the proppant particles is very durable. We also reasoned that liquid quaternary ammonium compounds (ionic liquids) would most easily treat a large surface area. The invention is also a treatment that would not cause water and hydrocarbons to emulsify.

Applicants' have discovered that solutions of quaternary ammonium compounds which are ionic liquids may be used to correct this flow retardation. This technology is not associated with down-hole fracturing in literature such as the Petroleum Engineer's Guide to Oil Field Chemicals and Fluids (Fink, Johannes, copyright 2011), or Applications of Ionic Liquids in the Chemical Industry (article from the The Royal Society of Chemistry's Chemical Society Reviews, 2008, 37, 123-150 by Plechkova, Natalia V. and Seddon, Kenneth R.). It is not taught by either U.S. Pat. No. 4,182,687 (Liquid Water Displacement Composition, Philip L. Bartlett, inventor, E. I. DuPont de Nemours, and Co.) or by patents that reference it. It is also not taught by the patents of major players in the oil-drilling industry such as BJ Services, Schlumberger, and Halliburton. These teach the use of non-shatterable proppant particles or, as in the case of Halliburton's U.S. Pat. No. 6,705,400, the deposition of a liquid-hardenable resin to coat the proppant particles to prevent fines shift and to improve liquid flow.

This invention also relates to particulate compositions suitable for hydraulic fracturing treatments (i.e., as a coated proppant), and also suitable for gravel packing in sand control, or for other well formation treatments. Specifically, the invention is directed to the use of a coated proppant in a method for enhancing the stabilization of, and reducing particulate flow back and fines transport in a well formation. The coated proppant comprises a proppant substrate having a quaternary ammonium ionic liquid attached to the outer surface of the proppant as a coating on the proppant substrate.

In order to prepare the coated proppant of the present invention, a crush resistant proppant substrate, which typically comprises a particulate material, such as sand, a naturally occurring mineral, such as fused zirconia, a ceramic, such as sintered bauxite, or a sintered alumina, or another non-ceramic refractory such as milled or glass beads, as well as their resin-coated counterparts, is coated with a quaternary ammonium ionic liquid. The proppant substrate used for preparing the coated proppant of the present invention should be sufficiently strong to withstand a closure pressure of at least 3,000 psi, preferably the crush resistance of the proppant substrate should be sufficient to withstand a closure pressure of at least 5,000 psi, and more preferably the crush resistance of the proppant substrate should be sufficient to withstand a closure pressure of at least 7,500 psi and higher.

The proppant substrate, such as sand or a ceramic (optionally pre-coated with a resin), generally has a distribution of particles having sizes in the range of from about 4 mesh to about 100 mesh (U.S. Standard Sieve numbers) (i.e. the particles pass through a screen opening of about 4760 microns (4 mesh) and are retained on a screen opening of about 150 microns (100 mesh)). Preferred proppant substrates have a distribution of particle sizes in the range of 8 mesh to 60 mesh, and more usually in the range of 16 mesh to 50 mesh ((preferably at least 90% by weight of the particles satisfy such mesh size range)). Particularly preferred proppant substrates have a distribution of particle sizes with at least 90% by weight of the particles having a size within the range of 20 mesh to 40 mesh, i.e., between about 850 and about 425 microns.

In accordance with the present invention, the proppant substrate then is provided with a coating of a quaternary ammonium ionic liquid. The coating process may utilize an organic solvent such as ethanol, propanol, isopropanol and others where the quaternary ammonium ionic liquid is soluble or partially soluble.

According to one or more embodiments, proppant substrates of lower apparent specific gravity may also be used. These types of proppants may include natural or synthetically produced materials and structures such as hollow glass balls, walnut hulls and porous ceramics. Using proppants having relatively lower apparent specific gravities may reduce the viscosity and pressure required to pump the fluid carrying the proppant through the subterraneous formation.

While the discussion herein refers to well drilling operations in particular, one of ordinary skill in the art will appreciate that the use of the coated proppants according to the present invention may be used in a variety of other applications and operations as well. For example, in addition to the oil drilling operations discussed above, the coated proppants may be used in gravel packing procedures in which a screening device is placed in a wellbore. Other hydrocarbon recovery-related operations may also benefit from the use of the coated proppants of the present invention as will be apparent to a worker skilled in such related procedures.

The present invention also pertains to a method of propping a subterranean formation using a proppant composition that consists essentially of the coated proppant of the present invention as the solids component and a carrier fluid for the proppant. In particular, in the method of using the composite proppant in accordance with the present invention, when the coated proppant of the present invention is introduced into the well formation with a carrier fluid, the coated proppant particulates comprise at least 60%, preferably 70%, more preferably 80% and generally 90% or higher (i.e., up to 100%) by weight of the proppant particulates then being introduced into the formation. In other words, proppant not having a surface coating of the quaternary ammonium ionic liquid are only introduced in a minor amount, or more preferably are not introduced except in a very minor amount (if at all) into the well formation at the same time (i.e., with the same carrier fluid in the proppant composition) that the coated proppant particulates of the present invention are introduced.

Our invention is to use solutions of quaternary ammonium compounds to deliver charged species to coat a pack of proppant and the walls of its containment area and create a treated surface that will improve the flow of different phases of liquids past it and through it. In particular, we sought a treatment that would produce a surface that would have minimal interaction with hydrocarbon fluids and minimal interaction with water. We reasoned that an ionic surface would have little interaction with hydrocarbons and that such a surface could be created by depositing quaternary ammonium compounds. We also reasoned that the alkyl or aryl organic groups of the quaternary ammonium compounds could be selected for little interaction with water. Because of the high affinity between charged species and the hard surfaces, this treatment would be expected to be durable. We also reasoned that liquid quaternary ammonium compounds (ionic liquids) would most easily treat a large surface area. We also sought a treatment that would not cause water and hydrocarbons to emulsify.

A wide variety of particulate proppant materials may be used in accordance with the present invention, including, but not limited to, sand, bauxite, ceramic materials, glass materials, resin precoated proppants, polymer materials, "TEFLON™" (tetrafluoroethylene) materials, nut shells, ground or crushed nut shells, seed shells, ground or crushed seed shells, fruit pit pieces, ground or crushed fruit pits, processed wood, composite particulates prepared from a binder with filler particulate including silica, alumina, fumed silica, carbon black, graphite, mica, titanium dioxide, meta-silicate, calcium silicate, kaolin, talc, zirconia, boron, fly ash, hollow glass microspheres, and solid glass, 20/40 White Blanc quartz, or mixtures thereof. The particulate material used may have a particle size in the range of from about 2 to about 400 mesh, U.S. Sieve Series. Preferably, the particulate material is graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the particulate materials. It should be understood that the term "particulate," as used in this disclosure, includes all known shapes of materials including substantially spherical materials, fibrous materials, polygonal materials (such as cubic materials) and mixtures thereof. It should also be understood that the term "proppant," as used in this disclosure, includes all known shapes of materials including substantially spherical materials, fibrous materials, polygonal materials (such as cubic materials) and mixtures thereof.

We have discovered that certain low-melting or liquid quaternary ammonium compounds that when coated onto a pack of proppant particles increase the flow of both water and hydrocarbons through it. Particular quaternary ammonium compounds include cocobis(2-hydroxyethyl)ethyl ammonium ethosulfate (CAM-2 DQ), didecyldimethylammonium dodecylbenzene sulfonate, di(benzylcocobis)hydroxyethylammonium phenolsulfonate (2C2BQPS), tallowbis(2-hydroxyethyl)ethylammonium ethyl sulfate, benzylcocoamidopropyldimethylammonium xylenesulfonate, di[benzylcocobis(hydroxyethyl)ammonium] phenolsulfonate, benzylcocoamidopropyldimethylammonium naphthalenesulfonate, benzylcocobis(hydroxyethyl)ammonium benzoate, benzylcocobis(hydroxyethyl)ammonium xylenesulfonate, benzylcocoamidopropyldimethylammonium 1,3-dimethylcarboxybenzene-5-sulfonate, stearylbis(hydroxyethyl)-methylammonium chloride, didecyldimethylammonium chloride, didecyldimethylammonium lactate, N-alkyl($C_{12}$-$C_{16}$)-N,N-dimethyl-N-benzylammonium chloride, benzylcocobis(hydroxy-ethyl)ammonium 2-ethylhexylsulfate, mix of mono(dicocodimethylammonium) isooctyl-phosphate and mono(dicocodimethylammonium diisooctylphosphate, benzylcocodimethyl-ammonium 2-ethylhexanoate, and a mix of mono(benzylcocodimethyl) ammonium 2-ethyl-hexylphosphate and benzylcocodimethylammonium di-2-ethylhexylphosphate.

The above quaternary ammonium ionic liquids are applied to the proppant using an alcoholic solution containing from about 0.0001% to about 10% by weight of ionic liquid per 50 grams of proppant. However, the concentration of ionic liquid may be adjusted higher or lower as required to achieve the maximum benefit in oil recovery and stimulation of the well.

The quaternary ammonium ionic liquids of the invention can be incorporated into the fracturing fluids in addition to other additives such as viscosifiers as well as surfactants that may be useful in the practice of the instant invention.

Our invention was improved by the use of quaternary ammonium compounds that were not only liquids but were also of limited solubility in both oil and water. This limited solubility improved the deposition of the ionic liquid.

Our invention was improved by the use of quaternary ammonium compounds that were durable to the proppant.

Our invention was improved by the use of quaternary ammonium compounds that were non- or poor emulsifiers of water into oil or oil into water.

The invention further provides a method of fracturing a subterranean formation penetrated by a wellbore, comprising at least the steps of: (1) formulating a fracturing fluid; (2) pumping the fracturing fluid down the wellbore at a rate and pressure sufficient to flow into the formation and to initiate or extend fractures in the formation; (3) reducing the applied pressure thereby allowing at least a portion of the injected fracturing fluid to flow back from the formation into the wellbore; and (4) removing such flowed back fracturing fluid from the wellbore, wherein the fracturing fluid includes a quaternary ammonium ionic liquid.

The method of fracturing a subterranean formation according to the present invention may be applied to any subterranean formation, preferably hydrocarbon containing subterranean formations. The hydrocarbons may be oil and/or gas. Besides oil and/or gas the formations may contain water which usually comprises salts. The salinity of the formation water may be for instance from 10,000 ppm to 230,000 ppm.

The formations may be sandstone, carbonate or shale formations and the formation temperature may be up to 175° C. For applying the method according to the present invention to the formation, the formation is penetrated by at least one wellbore. The wellbore may be a "fresh" wellbore drilled into the formation which needs to become prepared for oil and/or gas production. In another embodiment the wellbore may be a production well which already has been used for producing oil and/or gas but the production rate decreased and it is necessary to fracture the formation (again) in order to increase production.

The method according to the present invention comprises at least 4 process steps (1), (2), (3), and (4). The method may optionally comprise further process steps.

In the course of process step (1), an aqueous fracturing fluid comprising at least an aqueous base fluid, a proppant, a viscosifier, at least the flowback aid of the present invention and optionally further components is formulated. In general, the components of the fracturing fluid are mixed at the surface using conventional equipment and techniques.

In one embodiment, a concentrated solution of the flowback aids of the invention such as a concentrate as indicated above may be used and may be added to aqueous base fluid to achieve the final desired concentrations. The viscosifier and optionally further components are also to the aqueous base fluid. The components may be added in any order. The fluid is then thoroughly mixed and a proppant is added. The specific composition of the aqueous fracturing fluid and the concentrations of the components used are chosen by the skilled artisan according to the needs of the fracturing job.

In the course of process step (2), the fluid is pumped into a wellbore at a rate and pressure sufficient to flow into the formation and to initiate or extend a fracture in the formation. In order to initiate or to extend fractures in the formation of a bottomhole, pressure sufficient to open a fracture in the formation is necessary. The bottomhole pressure is determined by the surface pressure produced by the surface pumping equipment and the hydrostatic pressure of the fluid column in the wellbore, less any pressure loss caused by friction. The minimum bottomhole pressure required to initiate and/or extend fractures is determined by formation properties and therefore will vary from application to application. Methods and equipment for fracturing procedures are known to the skilled artisan. The fluid simultaneously transports suspended proppants and the proppant becomes deposited into the fractures and holds fractures open after the pressure exerted on the fracturing fluid has been released.

In the course of process step (3), the applied pressure is reduced thereby allowing at least a portion of the injected fracturing fluid to flow back from the formation into the wellbore. Reducing the pressure allows the fractures to close. Proppant "props" fractures open and fracturing fluid is shut in or allowed to flow back. At the surface, chokes may be used to generate a pressure differential to allow fluid to begin to flow from the formation into the well bore.

The flowback aids of the invention used in the fracturing fluid significantly facilitate the removal of the fracturing fluid injected. They minimize the amount of retention of water and the amount of water trapped in the wellbore from the formation and increase the amount of fluid recovered. The addition of flowback aids of the invention improves the fluid recovery and improves to regain permeability. Without wishing to be bound by theory we believe that this may be because the flowback aids of the invention used according to the method minimize capillary pressure, however other mechanisms may be at play.

In course of step (4), the aqueous fracturing fluid flowing back from the formation into the wellbore is removed from the wellbore. It goes without saying for the skilled artisan that the aqueous fracturing fluid recovered may no longer have exactly the same composition as the injected fluid but may be mixed with formation fluids such as oil and/or formation water. The total amount of fluid recovered usually depends on the formation, for instance on how much water the formation absorbs into its structure. Additionally, fluid may be lost to the formation. By the way of example in shale formations only 10 to 30% of the injected aqueous fracturing fluid may be recovered. The addition of the flowback aids of the invention enhances the amount of fluid recovered compared to using a fracturing fluid in which the flowback aids are not present.

For the method according to the present invention an aqueous fracturing fluid is used which comprises at least an aqueous base fluid, a proppant, a viscosifier, and a least one quaternary ammonium ionic liquid flowback aid dissolved in water or an organic solvent or mixtures thereof. The quaternary ammonium ionic liquid flowback aids assist in removing the injected fracturing fluid from the formation after a hydraulic fracturing treatment.

The aqueous base fluid for the fracturing fluid comprises water. Besides water the aqueous formulation may also comprise organic solvents miscible with water. Examples of such solvents comprise alcohols such as ethanol, n-propanol, i-propanol or butyl diglycol. If organic solvents are present their amount should not exceed 50% by weight with respect to the solvents present in the aqueous base fluid. In a preferred embodiment of the invention the aqueous base fluid comprises at least 70% by weight of water with respect to the solvents present in the aqueous base fluid, more preferably at least 90% by weight. In a further preferred embodiment of the invention only water is used as solvent in the aqueous base fluid. The aqueous base fluid may comprise dissolved salts. Examples of salts comprise halogenides, in particular chlorides, sulfates, borates of mono- or divalent cations such as $Li^+$, $Na^+$, $K^+$, $Mg^{2+}$, $Ca^{2+}$, $Sr^{2+}$, or $Ba^{2+}$. In a one embodiment of the invention, the aqueous fracturing fluid comprises at least one salt.

Preferably, the salt may be KCl and/or ammonium chloride. The salinity of the water, in particular the concentration of KCl and/or ammonium chloride may be from 0.1% by weight to 10% by weight relating to the aqueous base fluid, in particular from 0.5% to 8% by weight, preferably from 1% to 6% by weight and by the way of example 3 to 5% by weight.

The aqueous fracturing fluid furthermore comprises at least one proppant which is suspended in the aqueous fracturing fluid. Proppants are small hard particles which cause that fractures formed in course of the process do not close after removing the pressure. Suitable proppants are known to the skilled artisan. Examples of proppants include naturally-occurring sand grains, resin-coated sand, sintered bauxite, glass beads, or ultra lightweight polymer beads as well as those mentioned above.

The amount of proppants in the aqueous fracturing fluid may be from 50 kg/m$^3$ to 3500 kg/m$^3$ of the fracturing fluid, preferably from 50 kg/m$^3$ to 1200 kg/m$^3$ of the fracturing fluid.

The aqueous fracturing fluid furthermore comprises at least one viscosifier for increasing the viscosity of the fracturing fluid. Suitable viscosifiers for fracturing fluids are known to the skilled artisan. Viscosifiying agents may be water-soluble, thickening polymers, low molecular components such as viscosifying surfactants or combinations thereof.

Examples of polymers comprise biopolymers or modified biopolymers such as xanthans, Scleroglucane, galactomannan gums, cellulose derivatives such as hydroyethylcellulose, carboxyethylcellulose or carboxymethylcellulose. Further examples comprise synthetic polymers such as poly acrylamide or copolymers comprising acrylamide units such as copolymers of acrylamide and acrylic acid, sufonic acid groups comprising monomers or hydrophobically associating polymers. Polymers may also be used together with suitable crosslinkers. The skilled artisan knows how to select suitable viscosifiers according to his or her needs.

The aqueous fracturing fluid used in the method of fracturing according to the invention comprises at least one flowback aid selected from the group consisting of cocobis (2-hydroxy-ethyl)ethyl ammonium ethosulfate, didecyldimethylammonium dodecylbenzene sulfonate, di(benzylcocobis)hydroxyethyl-ammonium phenol sulfonate, cocobis (2-hydroxyethyl)ethyl-ammonium ethyl sulfate, tallowbis-(2-hydroxy-ethyl)-ethylammonium ethyl sulfate, benzylcoco-amidopropyldimethyl-ammonium xylene-sulfonate, dibenzylcocobis(hydroxyethyl)ammonium phenolsulfonate, benzylcocoamidopropyl-dimethylammonium naphthalenesulfonate, benzyl-cocobis(hydroxyethyl)ammonium benzoate, benzylcocobis(hydroxyethyl)ammonium xylene sulfonate, benzyl-cocoamidopropyldimethyl-ammonium 1,3-dimethylcarboxybenzene-5-sulfonate, M-2 MeCl stearylbis(hydroxyethyl)-methylammonium chloride, didecyldimethyl-ammonium chloride, didecyldimethyl-ammonium lactate, N-alkyl($C_{12}$-$C_{16}$)-N,N-dimethyl-N-benzylammonium chloride, benzylcocobis(hydroxy-ethyl)ammonium 2-ethylhexylsulfate, a mixture of mono(dicocodimethylammonium) isooctylphosphate and mono dicocodimethyl-ammonium diisooctylphosphate, benzylcocodimethylammonium 2-ethylhexanoate, a mixture of mono (benzylcocodimethyl)ammonium 2-ethylhexylphosphate and benzylcocodimethyl-ammonium di-2-ethylhexylphosphate and mixtures of all of the above.

The concentration of the quaternary ammonium ionic liquid in the aqueous fracturing fluid may vary according to the requirements of a particular fracturing job. Preferably, the quaternary ammonium ionic liquid is present in a concentration that is effective to improve the flowback of the fracturing fluid. In one embodiment, the quaternary ammonium ionic liquid is present within the fracturing fluid in a concentration between 0.00005 and 10 percent by weight. A more preferred quaternary ammonium ionic liquid is with the concentration between 0.001 and 5.5 percent by weight; a yet more preferred quaternary ammonium ionic liquid is with the concentration between 0.1 and 2.5 percent by weight; and an even yet more preferred quaternary ammonium ionic liquid concentration is between 0.2 and 2.0 percent by weight of the fracturing fluid.

The aqueous fracturing fluid may include additional components that are known to those skilled in the art. For example, the aqueous fracturing fluid may include the coated proppant of the invention. Furthermore, the aqueous fracturing fluid may include one or more additive selected from an acid, a friction reducing agent, a viscosifying agent, a viscosifying agent activator or crosslinker, a biocide, a clay stabilizer, an anti-foaming agent, a pH adjuster, a corrosion inhibitor, a fluid-loss additive, an iron control agent, a scale inhibitor or scale control agent, a chelating agent, a viscosifying-agent breaker, and combinations thereof.

Water that is not recovered from the formation can result in phase-trapping or water block. It may result in formation damage i.e. reduced productivity of the well. The flowback aids of the invention serve to avoid such problems.

Due to their excellent performance in improving fluid recovery, the flowback aids of the present invention are very good substitutes for flowback aids known in the state in the art.

EXAMPLES

The following examples are intended to demonstrate the usefulness of the compositions of the present invention and should not be construed to limit the scope of the invention in anyway.

The following test procedure is common to all examples.

Elution Test Procedure

This procedure determines the elution rates of water and oil as they run back-to-back, in tandem, through proppant. It also determines if the quaternary ammonium compound ionic fluid is substantive to the proppant.

Materials

Buret—50 ml, Kimax, TD, 0.5 inch outer diameter, with detachable tip and stopcock.

Bromophenol blue solution (0.2% in water)—is naturally purple in water but turns blue when quaternary ammonium compounds are also present in the water.

Proppant powder—20/40 White Blanc quartz

Deionized (DI) water.

Isopar L paraffinic oil

(A) Preparation of Proppant Packed Column (1) Pour 50 grams of dry proppant powder into the buret.
(2) Plug the top of the buret and invert it and right it, allowing the proppant to fall back into place.
(3) Remove the buret from its support and gently tap it on the bench-top to compact the proppant to approximately the 25.5 ml mark.
(4) Prepare a 0.62% active solution in anhydrous isopropyl alcohol, by volume, of the proppant chemical coating chemical to be tested.
(5) Add 25 ml of this solution to the buret and allow it to elute completely through the proppant column. Measure the amount of eluent collected.

(6) When the drops have slowed to 30 seconds apart, note the number of milliliters of material that has come through.

(B) First Elution with Water: (Check for Substantivity of Quaternary Ammonium Compound on the Proppant)

(1) After the column has been prepared as above, add 25 ml of DI water to it and begin timing when the water contacts the top of the proppant pack.
(2) Allow the water to drain down until the meniscus is at the top of the proppant. Stop the timing. Note how long it took for the water to get completely into the pack.
(3) Allow the water to elute through the column until the drops from the tip of the buret are 30 seconds apart. Segregate the elutant and note how many milliliters came through.
(4) Add 1 drop of the bromophenol blue solution to the eluted water and note the color. A blue color indicates that there is quaternary compound leaching from the column and proppant. No color indicates that the proppant is saturated with quaternary and there is none leaching out.

(C) First Elution with Oil (1) After the column has been prepared and has had 25 ml of water run through it, add 25 ml of Isopar L. Start timing as soon as the Isopar L contacts the top of the sand column.
(2) Allow the Isopar to elute through the column, noting the time it takes for the Isopar meniscus to reach the top of the sand.
(3) Then allow all the Isopar to elute all the way through the column.

(D) Repeat Back-To-Back Elutions with Alternating Water and Oil (1) After all the oil has eluted through the column, add 25 mL of DI water and track the time from the first contact of the water with the proppant to when the meniscus reaches the top of the proppant.
(2) Allow all of the water to drain from the column (or until the drops are 30 seconds apart.)
(3) Add 25 mL of Isopar L and determine the time from the first contact of the Isopar L with the proppant to when the meniscus reaches the top of the proppant.
(4) Allow all of the Isopar to elute from the column.
(5) Repeat steps D1-D4 at least eight more times. At the end of this series, the experimenter will have 10 water elution times and 10 Isopar L elution times. Report the last measured elution time for water and for Isopar L.

(D) End-Of-Experiment Proof of the Attachment of the Quat to the Proppant (1) Invert the buret and empty the proppant into a four ounce glass jar.
(2) Add 75 mL of DI water to the jar and shake it.
(3) Add 3 drops of bromophenol blue and note the color. If the water layer is purple and the proppant is yellow, then there is no quaternary present on the proppant. If, however, the water is clear and colorless, and the proppant is green, then there is quaternary amine remaining attached to the proppant.

EXAMPLE I

Demonstration that Coating with Ionic Liquids Speeds up Flow Rates

The results below are averages of 4 to 10 runs.

|  | Tenth water elution time | Tenth Isopar L elution time |
|---|---|---|
| Blank (water and oil with no test material coated on proppant) | 5.14 min | 12.98 min |
| 0.62% CAM-2 DQ {cocobis(2-hydroxyethyl)ethyl ammonium ethosulfate | 3.25 min | 8.36 min |
| 0.62% didecyldimethylammonium dodecylbenzene sulfonate | 3.11 min | 8.09 min |
| 0.62% 2C2BQPS {di(benzylcocobis)hydroxyethylammonium phenolsulfonate} | 4.04 min | 8.91 min |

EXAMPLE II

Demonstration that the Coating is Substantive to the Surface of the Proppant

The green color of the proppant under the staining by the bromophenol blue proves the quaternary mixture is substantive to the surface of the proppant.

| See steps of D1-D3 of the procedure above | Color of water of the stained mix at the end of the ten elutions. | Color of proppant in the stained water mix at the end of the ten elutions. |
|---|---|---|
| Blank (elutants with no test material) | purple | yellow |
| 0.62% CAM-2 DQ {cocobis(2-hydroxyethyl) ethyl ammonium ethosulfate} | Clear and water white | green |
| 0.62% 2C2BQPS {di(benzylcocobis)hydroxyethylammonium phenolsulfonate} | Clear and water white | green |

EXAMPLE III

Investigation of Other Structures

Generally, the shorter the cationic portion, the faster the elution rate and the more durable the film. A variety of anions can be used.

|  | Water elution time | Isopar L elution time |
|---|---|---|
| Blank (elutants with no test material) | 5.14 min | 12.98 min |
| 0.62% CAM-2 DQ {cocobis(2-hydroxyethyl)ethylammonium ethyl sulfate} | 3.25 min | 8.36 min |
| 0.62% didecyldimethylammonium dodecylbenzene sulfonate | 3.11 min | 8.09 min |

-continued

| | Water elution time | Isopar L elution time |
|---|---|---|
| 0.62% TAM-2 DQ {tallowbis(2-hydroxyethyl)ethylammonium ethyl sulfate} | 3.79 min | 8.05 min |
| 0.62% BCAXS {benzylcocoamidopropyldimethylammonium xylenesulfonate} | 3.40 min | 10.15 min |
| 0.62% 2C2BQPS {di[benzylcocobis(hydroxyethyl)ammonium] phenolsulfonate} | 4.04 min | 8.91 min |
| 0.62% BCANS {benzylcocoamidopropyldimethylammonium naphthalenesulfonate} | 3.63 min | 11.42 min |
| 0.62% C2BQB {benzylcocobis(hydroxyethyl)ammonium benzoate} | 3.40 min | 9.83 min |
| 0.62% C2BQXS (terminated at 2 pts) {benzylcocobis(hydroxyethyl)ammonium xylenesulfonate} | 6.2 min | 17.3 min |
| 0.62 BCASIPA {benzylcocoamidopropyldimethylammonium 1,3-dimethylcarboxybenzene-5-sulfonate} | 3.41 min | 10.44 min |
| 0.62% SAM-2 MeCl {stearylbis(hydroxyethyl)methylammonium chloride} | 5.16 min | 10.42 min |
| 0.62% didecyldimethylammonium chloride | 2.90 min | 8.58 min |
| 0.62% didecyldimethylammonium lactate | 3.53 min | 8.34 min |
| 0.62% QAC-50 {N-alkyl($C_{12}$-$C_{16}$)-N,N-dimethyl-N-benzylammonium chloride} | 3.29 min | 10.72 min |
| 0.62% C2BQ8425 {benzylcocobis(hydroxyethyl)ammonium 2-ethylhexylsulfate} | 3.53 min | 9.43 min |
| 0.62% 2C-IO mix of {mono(dicocodimethylammonim) isooctylphosphate} and {mono(dicocodimethylammonium diisooctylphosphate} | 3.63 min | 15.72 min |
| 0.62% R2-EH {benzylcocodimethylammonium 2-ethylhexanoate} | 3.63 min | 11. 81 min |
| 0.62% R2-EHP mix of {mono(benzylcocodimethyl)ammonium 2-ethylhexylphosphate} and {benzylcocodimethylammonium di-2-ethylhexylphosphate} | 3.294 | 10.186 min |

All patents, patent applications and publications cited in this application including all cited references in those patents, applications and publications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A method of fracturing a subterranean formation comprising:
   forming proppant comprising a particulate material comprising a quaternary ammonium ionic liquid as a coating on an outer surface of said particulate material;
   introducing a fracturing fluid through a well bore into the subterranean formation, wherein the fracturing fluid comprises said proppant;
   pressurizing the fracturing fluid to fracture the subterranean formation;
   allowing said proppant to form a particulate pack; and
   allowing the fracturing fluid to flow back into the well bore from the subterranean formation.

2. The method of claim 1, wherein said quaternary ammonium ionic liquid is selected from the group consisting of cocobis(2-hydroxyethyl)ethyl ammonium ethosulfate, didecyldi-methylammonium dodecylbenzene sulfonate, di(benzylcocobis)hydroxyethyl-ammonium phenol sulfonate, cocobis(2-hydroxyethyl)ethylammonium ethyl sulfate, tallowbis-(2-hydroxy-ethyl)-ethylammonium ethyl sulfate, benzylcocoamidopropyldimethyl-ammonium xylene-sulfonate, dibenzylcocobis(hydroxyethyl)ammonium phenolsulfonate, benzylcocoamidopropyl-dimethylammonium naphthalenesulfonate, benzylcocobis (hydroxy-ethyl)ammonium benzoate, benzylcocobis(hydroxyethyl)ammonium xylenesulfonate, benzyl-cocoamidopropyldimethyl-ammonium 1,3-dimethylcarboxybenzene-5-sulfonate, M-2 MeCl stearylbis(hydroxyethyl)-methylammonium chloride, didecyldimethylammonium chloride, didecyldimethyl-ammonium lactate, N-alkyl($C_{12}$-$C_{16}$)-N,N-dimethyl-N-benzylammonium chloride, benzylcocobis(hydroxy-ethyl)ammonium 2-ethylhexylsulfate, a mixture of mono(dicocodimethyl-ammonium) isooctyl-phosphate} and mono-dicocodimethyl-ammonium diisooctylphosphate, benzylcocodimethyl-ammonium 2-ethyl-hexanoate, a mixture of mono (benzylcocodimethyl)-ammonium 2-ethyl-hexylphosphate and benzylcocodimethyl-ammonium di-2-ethylhexylphosphate and mixtures of all of the above.

3. The method of claim 1, wherein said particulate material is selected from the group consisting of sand, bauxite, ceramic materials, glass materials, resin precoated proppants, polymer materials, nut shells, ground or crushed nut shells, seed shells, ground or crushed seed shells, fruit pit pieces, ground or crushed fruit pits, processed wood, composite particulates prepared from a binder with filler particulate including silica, alumina, fumed silica, carbon black, graphite, mica, titanium dioxide, meta-silicate, calcium silicate, kaolin, talc, zirconia, boron, fly ash, hollow glass microspheres, and solid glass, 20/40 White Blanc quartz, or mixtures thereof.

4. The method of claim 3, wherein said polymer materials comprise tetrafluoroethylene.

5. A method of enhancing recovery of oil or gas during fracturing or stimulation processes, the method comprising:
   (i) adding the flowback aid composition comprising proppant into a subterranean formation via water or injection brine wherein said proppant comprises a proppant substrate wherein said proppant substrate comprises a particulate material wherein said particulate material has a quaternary ammonium ionic liquid as a coating on an outer surface of said particulate material, (ii) reducing surface or interfacial tension and/or increasing contact angle, and thereby (iii) allowing enhanced fluid recovery during the fracturing or stimulation processes.

6. The method of claim 5, wherein the quaternary ammonium ionic liquid is selected from the group consisting of cocobis(2-hydroxyethyl)ethyl ammonium ethosulfate, didecyldi-methylammonium dodecylbenzene sulfonate, di(benzylcoco-bis)hydroxyethyl-ammonium phenol sulfonate, cocobis(2-hydroxyethyl)ethylammonium ethyl sulfate, tallowbis-(2-hydroxy-ethyl)-ethylammonium ethyl sulfate, benzylcocoamidopropyl-dimethyl-ammonium xylene-sulfonate, dibenzylcocobis(hydroxyethyl)ammonium phenolsulfonate, benzylcocoamidopropyl-dimethylammonium naphthalenesulfonate, benzylcocobis (hydroxyethyl)ammonium benzoate, benzylcocobis(hydroxyethyl)ammonium xylenesulfonate, benzylcocoamidopropyldimethyl-ammonium 1,3-dimethylcarboxybenzene-5-sulfonate, M-2 MeCl stearylbis(hydroxyethyl)-methylammonium chloride, didecyldimethylammonium chloride, didecyldimethyl-ammonium lactate, N-alkyl (C12-C16)-N, N-dimethyl-N-benzyl-ammonium chloride, benzylcocobis(hydroxy-ethyl) ammonium 2-ethylhexylsulfate, a mixture of mono (dicocodimethyl-ammonium) isooctyl-phosphate} and mono-dicocodime thy 1 ammonium diisooctylphosphate, benzylcocodimethyl-ammonium 2-ethyl-hexanoate, a mixture of mono(benzylcocodimethyl)-ammonium 2-ethyl-hexylphosphate and benzylcocodimethyl-ammonium di-2-ethylhexylphosphate and mixtures of all of the above.

7. A method of fracturing a subterranean formation penetrated by a wellbore, comprising at least the steps of:
(1) formulating a fracturing fluid wherein the fracturing fluid comprises a proppant comprising a proppant substrate comprising a particulate material wherein said particulate material is coated on an outer surface with a quaternary ammonium ionic liquid;
(2) pumping the fracturing fluid down the wellbore at a rate and pressure sufficient to flow into the formation and to initiate or extend fractures in the formation;
(3) reducing the applied pressure thereby allowing at least a portion of the injected fracturing fluid to flow back from the formation into the wellbore; and
(4) removing such flowed back fracturing fluid from the wellbore.

8. The method of claim 7, wherein the quaternary ammonium ionic liquid is selected from the group consisting of cocobis (2-hydroxyethyl)ethyl ammonium ethosulfate, didecyldi-methylammonium dodecylbenzene sulfonate, di(benzylcocobis) hydroxyethyl-ammonium phenol sulfonate, cocobis(2-hydroxyethyl)ethylammonium ethyl sulfate, tallowbis-(2-hydroxy-ethyl)-ethylammonium ethyl sulfate, benzylcocoamidopropyl-dimethyl-ammonium xylene-sulfonate, dibenzylcocobis(hydroxyethyl)ammonium phenolsulfonate, benzylcocoamidopropyl-dimethylammonium naphthalenesulfonate, benzylcocobis (hydroxyethyl)ammonium benzoate, benzylcocobis(hydroxyethyl)ammonium xylenesulfonate, benzylcocomidopropyldimethyl-ammonium 1,3-dimethylcarboxybenzene-5-sulfonate, M-2 MeCl stearylbis(hydroxyethyl)-methylammonium chloride, didecyldimethylammonium chloride, didecyldimethyl-ammonium lactate, N-alkyl (C12-C16)-N, N-dimethyl-N-benzyl-ammonium chloride, benzylcocobis(hydroxy-ethyl) ammonium 2-ethylhexylsulfate, a mixture of mono (dicocodimethyl-ammonium) isooctyl-phosphate} and mono-dicocodime thy 1 ammonium diisooctylphosphate, benzylcocodimethyl-ammonium 2-ethyl-hexanoate, a mixture of mono(benzylcocodimethyl)-ammonium 2-ethyl-hexylphosphate and benzylcocodimethyl-ammonium di-2-ethylhexylphosphate and mixtures of all of the above.

\* \* \* \* \*